US011216793B2

(12) United States Patent
Barkan et al.

(10) Patent No.: US 11,216,793 B2
(45) Date of Patent: Jan. 4, 2022

(54) SELF-CHECKOUT KIOSK

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/888,319

(22) Filed: May 29, 2020

(65) Prior Publication Data
US 2021/0374699 A1    Dec. 2, 2021

(51) Int. Cl.
    *G06Q 20/18*    (2012.01)
    *G06K 7/14*     (2006.01)
    *G06K 7/10*     (2006.01)
    *G06K 9/00*     (2006.01)

(52) U.S. Cl.
    CPC .......... *G06Q 20/18* (2013.01); *G06K 7/1095* (2013.01); *G06K 7/1098* (2013.01); *G06K 7/1417* (2013.01); *G06K 9/00201* (2013.01); *G06K 9/00221* (2013.01); *G06K 9/00335* (2013.01)

(58) Field of Classification Search
    CPC .. G06Q 20/18; G06K 9/00335; G06K 7/1417; G06K 7/1095; G06K 7/1098; G06K 9/00221; G06K 9/00201
    See application file for complete search history.

(56) References Cited

U.S. PATENT DOCUMENTS

| 5,115,888 A | 5/1992 | Schneider |
| 5,294,782 A | 3/1994 | Kumar |
| 5,371,348 A | 12/1994 | Kumar et al. |
| 5,936,218 A | 8/1999 | Ohkawa et al. |
| 5,992,570 A | 11/1999 | Walter et al. |
| 7,073,717 B1 | 7/2006 | Arnold et al. |
| 7,296,752 B2 | 11/2007 | Carnevali |

(Continued)

OTHER PUBLICATIONS

International Search Report and Written Opinion for International Application No. PCT/US2021/28204 dated Jul. 14, 2021.

*Primary Examiner* — Matthew Mikels
(74) *Attorney, Agent, or Firm* — Yuri Astvatsaturov

(57) ABSTRACT

A kiosk includes a barcode reader module, vision camera, and central processing unit positioned within a housing. The housing defines a front surface and has an upper portion that extends outward past the front surface. The barcode reader module includes an imaging assembly with a first field-of-view that defines a product scanning region. The vision camera is positioned within the upper portion of the housing with at least a portion of the vision camera located forward of the front surface of the housing and has a second field-of-view facing generally downward and intersecting the first field-of-view of the barcode reader module within the product scanning region. The central processing unit is operatively connected to the barcode reader module and the vision camera and is configured to decode barcodes captured by the barcode reader module and perform advanced processing of images received from the vision camera.

34 Claims, 11 Drawing Sheets

(56) References Cited

U.S. PATENT DOCUMENTS

| | | |
|---|---|---|
| 2003/0029917 A1 | 2/2003 | Hennick et al. |
| 2003/0163388 A1* | 8/2003 | Beane .................. G06Q 20/18 |
| | | 705/26.1 |
| 2010/0059569 A1 | 3/2010 | Maemori |
| 2011/0198400 A1 | 8/2011 | Sano |
| 2011/0231285 A1 | 9/2011 | Euglund et al. |
| 2015/0019009 A1* | 1/2015 | Feldman ............... A61J 7/0454 |
| | | 700/237 |
| 2018/0314863 A1 | 11/2018 | Gao et al. |
| 2019/0172041 A1* | 6/2019 | Hill ..................... G06Q 20/203 |
| 2021/0142015 A1 | 5/2021 | Drzymala et al. |

* cited by examiner

SELF-CHECKOUT KIOSK

FIELD OF THE DISCLOSURE

The present patent relates generally to self-checkout kiosks and, in particular, to self-checkout kiosks having barcode readers and vision cameras.

BACKGROUND

Self-checkout kiosks and other kiosks that use barcode readers are becoming more prolific in retail environments. The purpose of these kiosks is two-fold: to help the stores redirect their employees to perform other important tasks and to help customers get what they need more quickly, whether that be to place an order, or checkout of a store.

However, since an employee is not always monitoring each kiosk directly, there can be a number of problems with their use, including users not scanning items that they are taking out of the store, users scanning the incorrect items, or users using the kiosk to purchase age-restricted items. These situations can result in inventory shrink that offsets any monetary benefit of having the kiosk in the first place.

SUMMARY

In an embodiment, the present invention is a kiosk comprising a housing, a barcode reader module, a vision camera, and a central processing unit. The housing defines a front surface and has an upper portion that extends outward past the front surface. The barcode reader module is positioned within the housing and includes an imaging assembly having a first field-of-view that extends through a window in the housing and defines a product scanning region. The vision camera is positioned within the upper portion of the housing with at least a portion of the vision camera located forward of the front surface of the housing, above and in general vertical alignment with the barcode reader module. The vision camera has a second field-of-view facing generally downward and intersecting the first field-of-view of the barcode reader module within the product scanning region. The central processing unit is positioned within the housing, is operatively connected to the barcode reader module and the vision camera, and is configured to decode barcodes captured by the barcode reader module and perform advanced processing of images received from the vision camera.

In another embodiment, the present invention is a kiosk comprising a housing that defines a front surface, a barcode reader module, a first vision camera, a second vision camera, and a central processing unit. The barcode reader module is positioned within the housing and includes an imaging assembly having a first field-of-view that extends through a window in the housing and defines a product scanning region. The first vision camera is positioned within the housing above and in general vertical alignment with the barcode reader module and has a second field-of-view facing generally downward and intersecting the first field-of-view of the barcode reader module within the product scanning region. The second vision camera is positioned within the housing below and in general vertical alignment with the imaging assembly of the barcode reader module and has a third field-of-view facing generally upward and intersecting the first field-of-view of the barcode reader module and the second field-of-view of the first vision camera within the product scanning region. The central processing unit is positioned within the housing and is operatively connected to the barcode reader module, the first vision camera, and the second vision camera. The central processing unit is configured to decode barcodes captured by the barcode reader module and perform advanced processing of images received from the first vision camera and the second vision camera.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
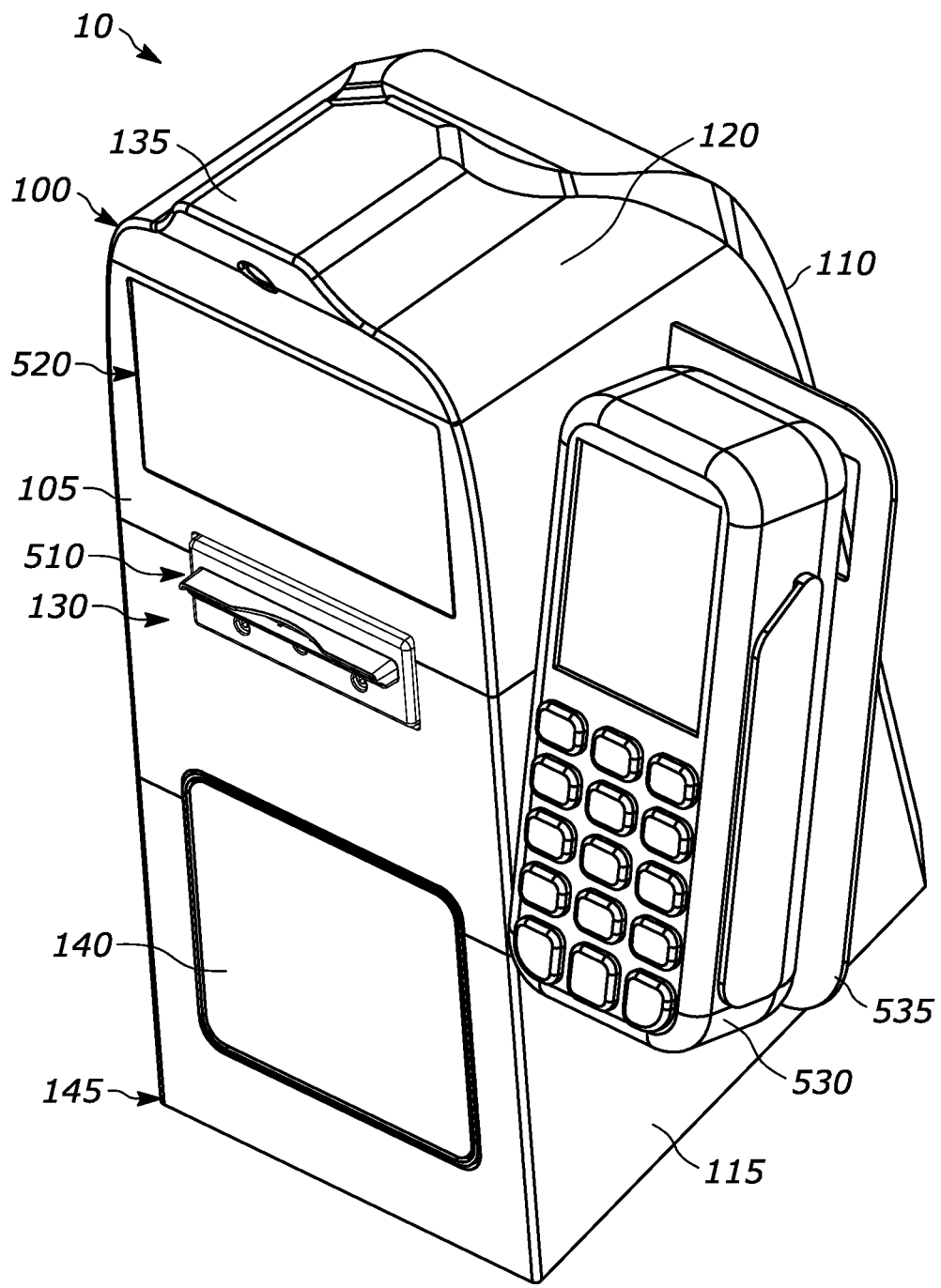
FIG. 1 illustrates a perspective view of an example kiosk.
Figure 2:
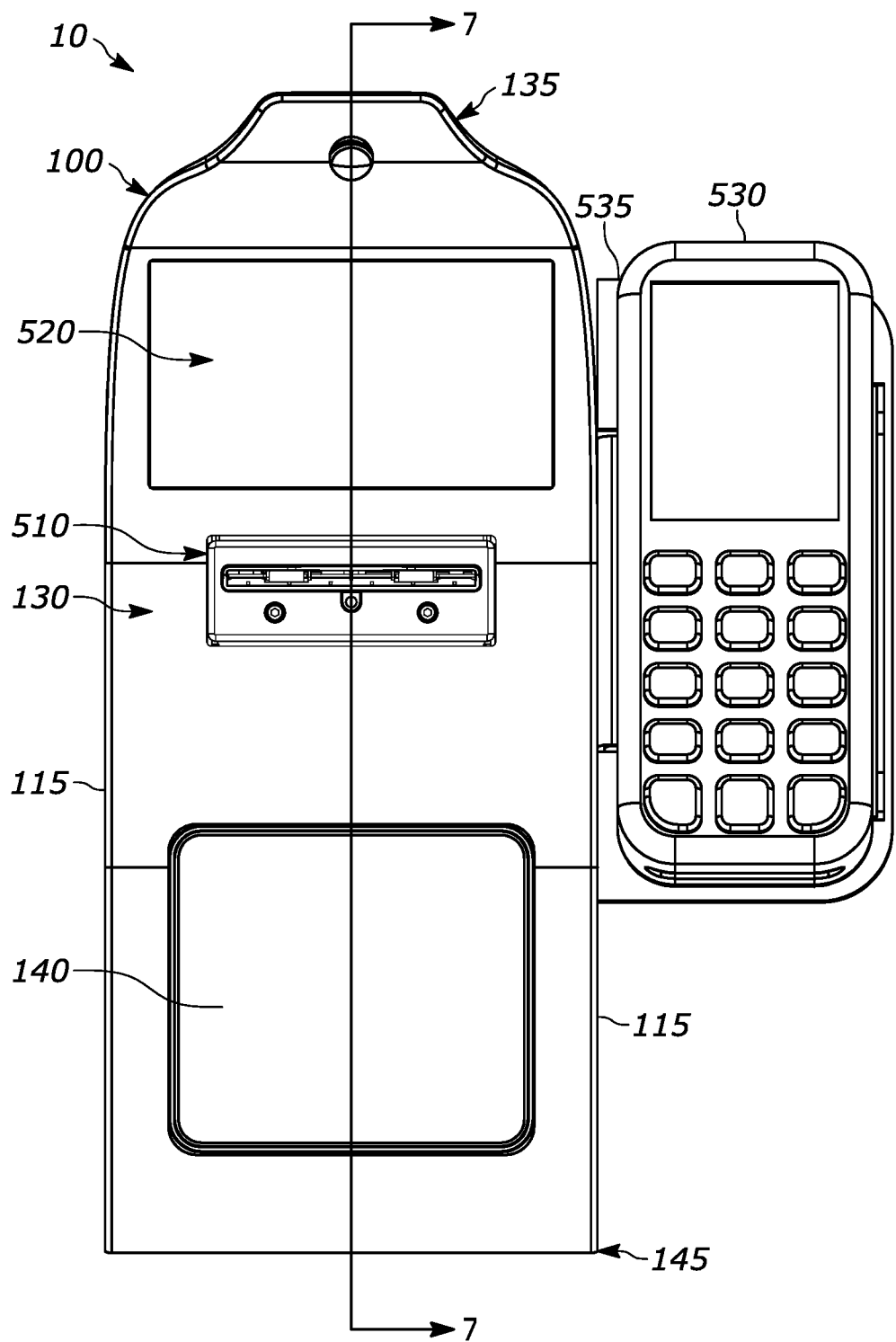
FIG. 2 illustrates a front view of the kiosk of FIG. 1.
Figure 3:
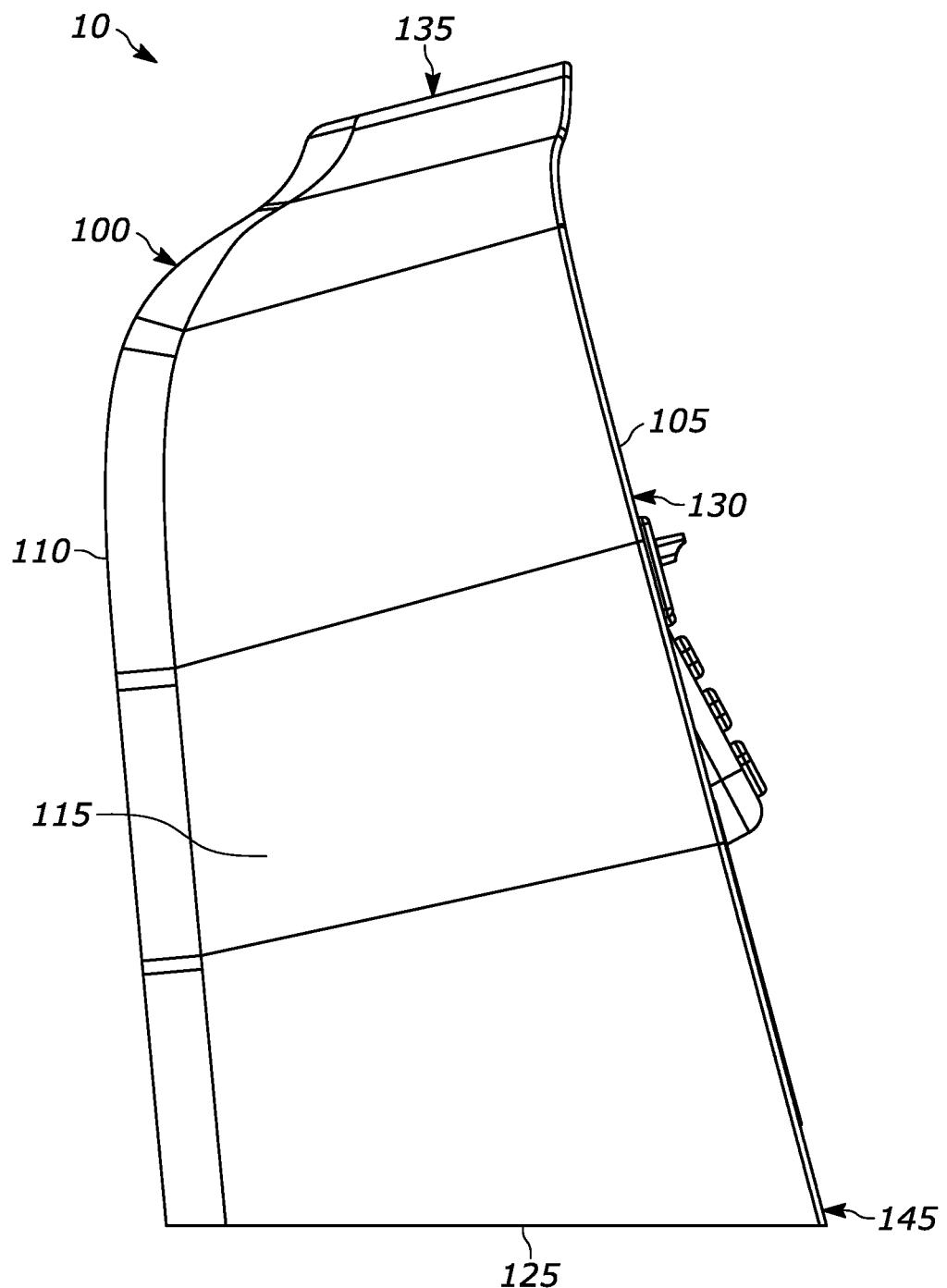
FIG. 3 illustrates a left side view of the kiosk of FIG. 1.
Figure 4:
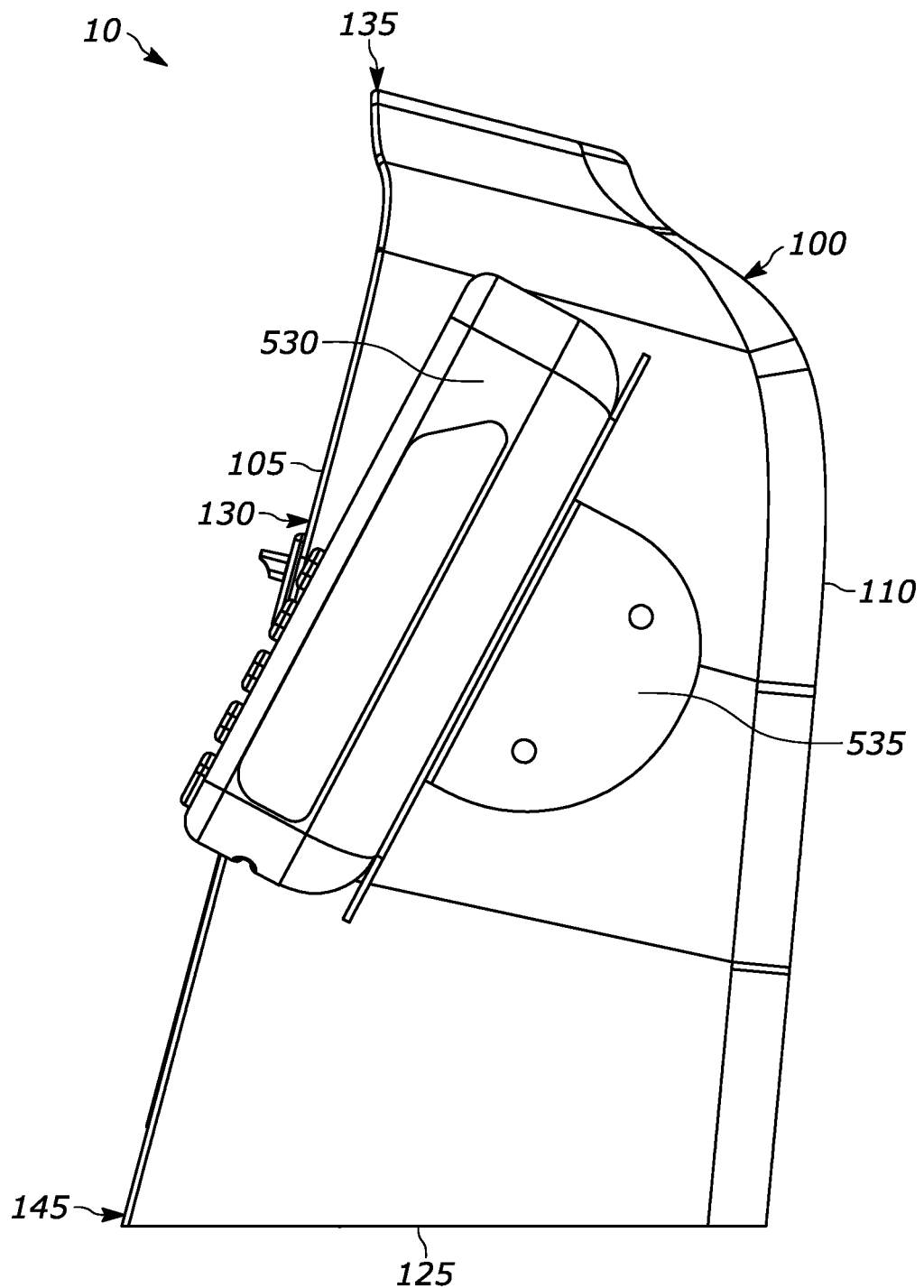
FIG. 4 illustrates a right side view of the kiosk of FIG. 1.
Figure 5:
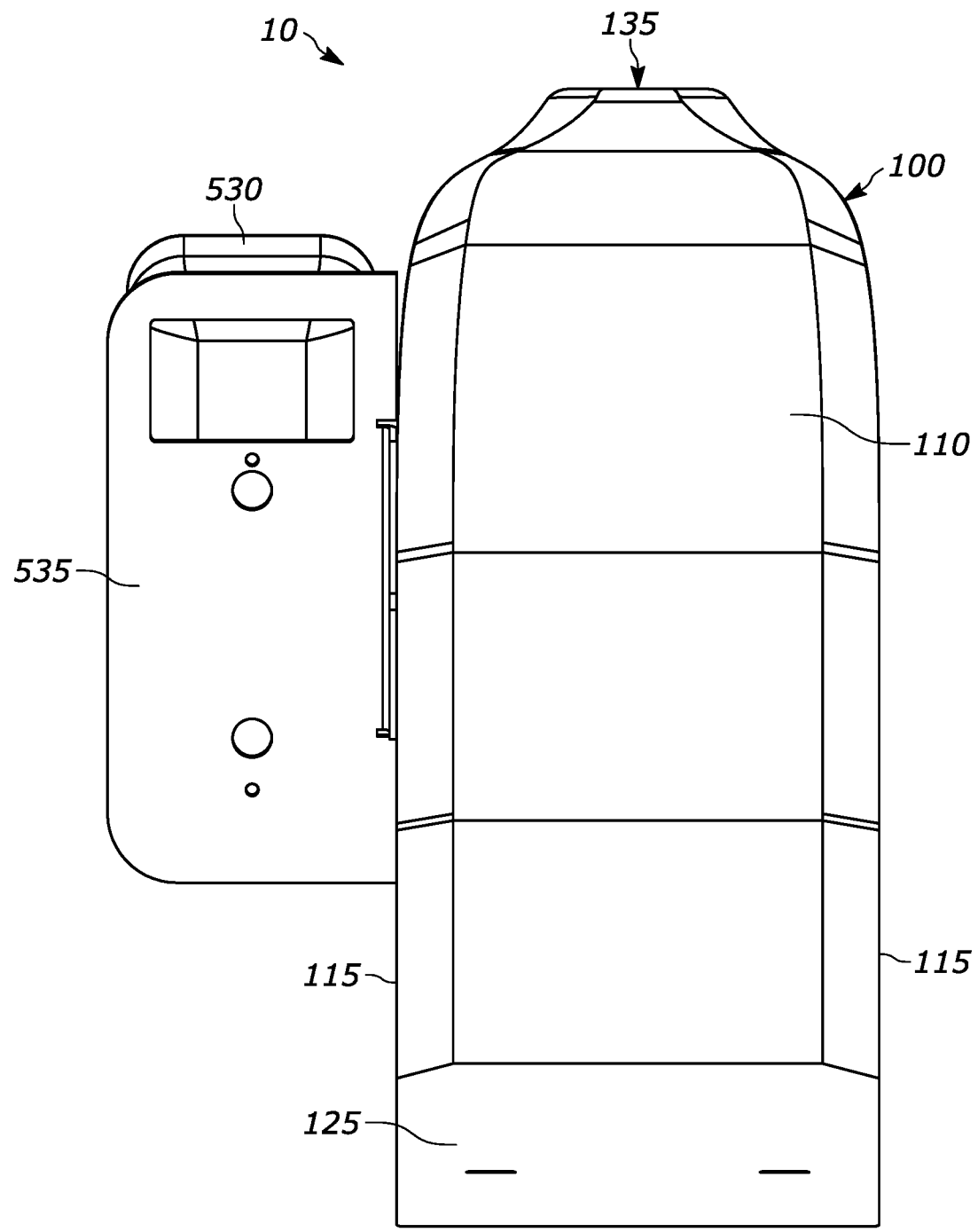
FIG. 5 illustrates a rear view of the kiosk of FIG. 1.
Figure 6:
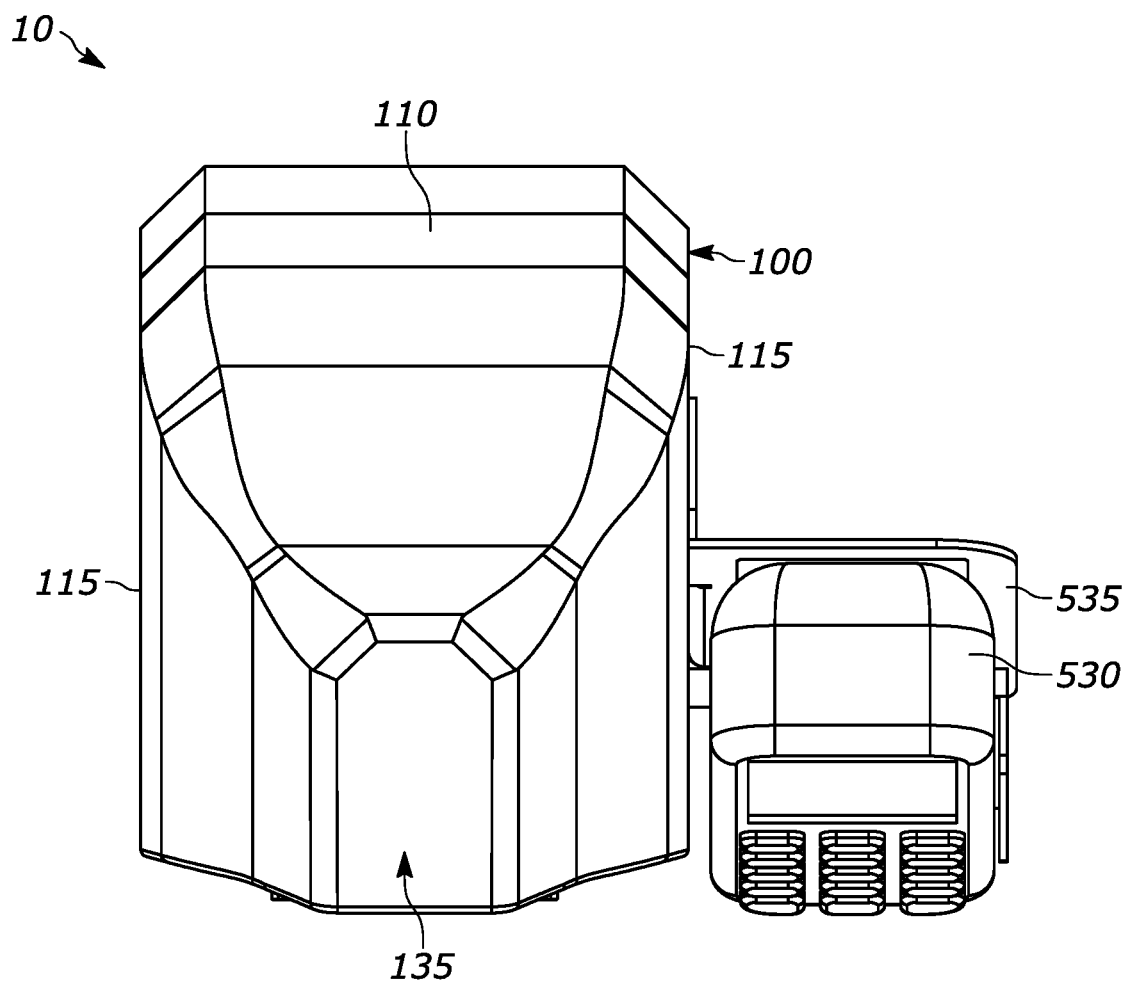
FIG. 6 illustrates a top view of the kiosk of FIG. 1.
Figure 7:
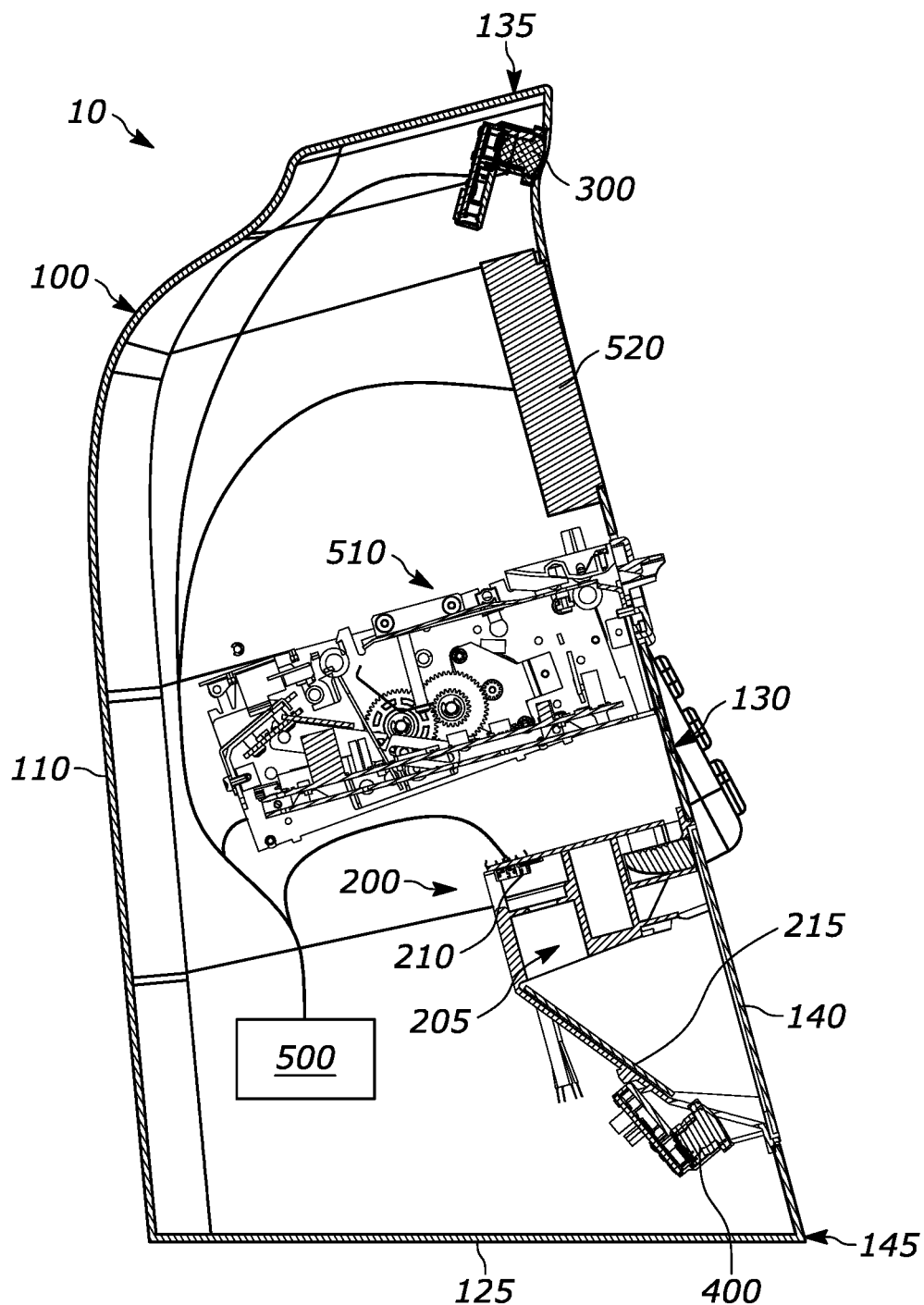
FIG. 7 illustrates a cross-sectional view of the kiosk of FIG. 1, taken along line 7-7 in FIG. 2.
Figure 8:
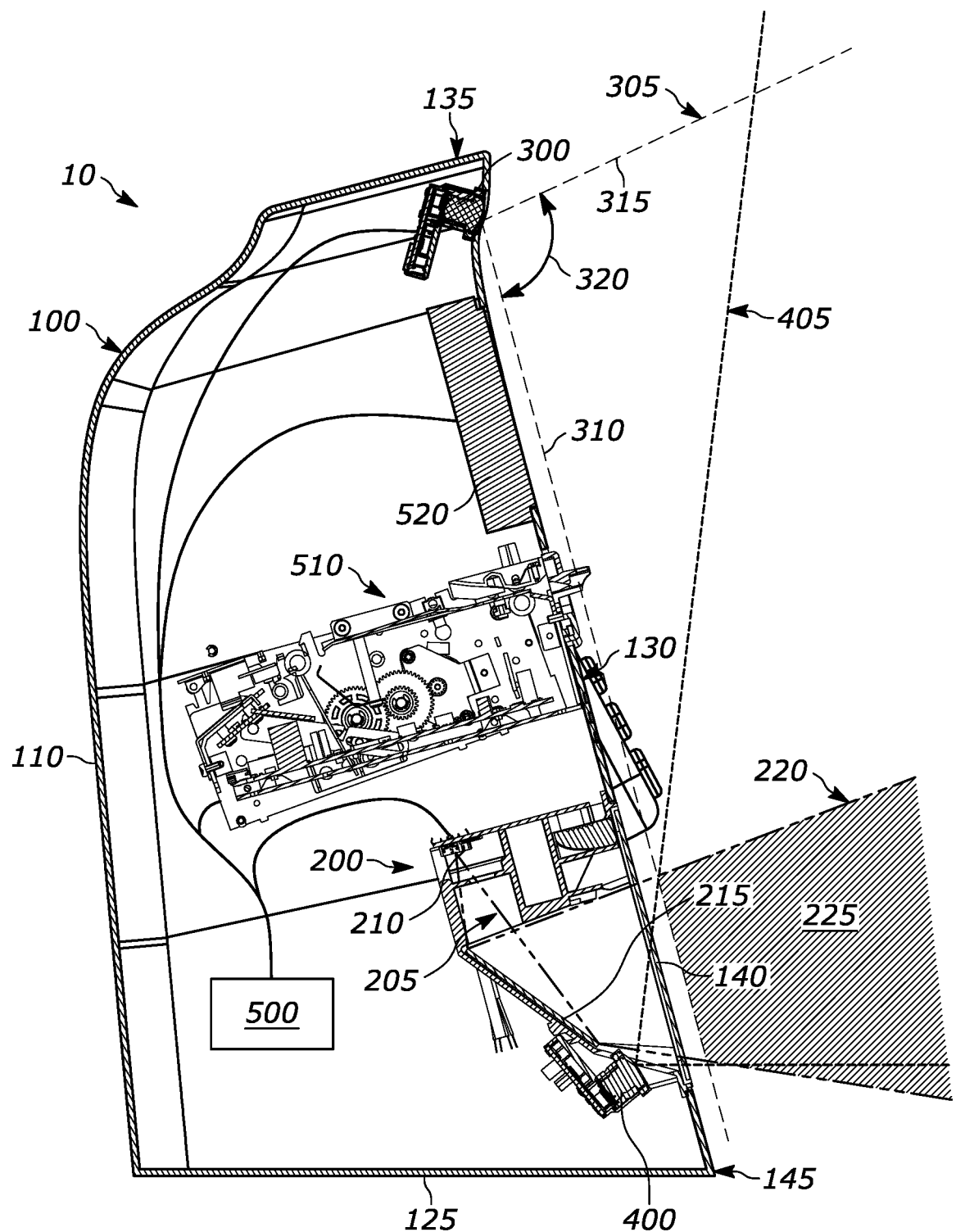
FIG. 8 illustrates the cross-sectional view of FIG. 7 with exemplary fields-of-view of the imaging assembly, vision camera, and second vision camera.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

Referring to FIGS. 1-8, an example self-checkout kiosk 10 is shown having a housing 100 with a front wall 105 that defines a front surface 130 of housing 100, rear wall 110, opposing side walls 115, top wall 120, and bottom wall 125. Housing 100 preferably has an upper portion 135 that extends outward past front surface 130 and can also protrude upwards from top wall 120.

A barcode reader module 200 is positioned within housing 100 and includes imaging assembly 205 with an imager 210 and optical components 215, such as mirrors, that that direct a first field-of-view 220 of imaging assembly 205 through a window 140 in front wall 105 of housing 100 to define a product scanning region 225, where the barcodes of products can be read by barcode reader module 200.

A vision camera 300, such as a 2 megapixel color camera, is positioned within upper portion 135 of housing 100 such that at least a portion of vision camera 300 is located forward of front surface 130 and vision camera 300 is above and in general vertical alignment with barcode reader module 200. Vision camera 300 has a second field-of-view 305 that faces generally downward and intersects first field-of-view 220 of imaging assembly 205 within product scanning region 225. Two overlapping field-of-view (first field-of-view 220 of imaging assembly 205 and second field-of-view 305 of vision camera 300) from different angles also helps to more accurately identify items for object recognition. Since different sides of an object can be seen by imaging assembly 205 and vision camera 300, the accuracy of item identification in a convolutional neural network system can be greatly improved. To intersect first field-of-view 220 within product scanning region 225 and provide a sufficient view for vision camera 300, vision camera 300 is positioned more than 12 inches, preferably 14½ inches, above a bottom 145 of housing 100 and lower boundary 310 of second field-of-view 305 of vision camera 300 is less than 2 inches from front surface 130 of housing 100 at bottom 145 of housing 100 and, preferably, is substantially parallel to front surface 130. Second field-of-view 305 of vision camera 300 can also be oriented to encompass objects that are located adjacent to kiosk 10. This allows kiosk 10 to monitor adjacent payment terminals and for items left in a cart or basket, items left in a bagging area, printed receipts left in a printer, etc. In addition, second field-of-view 305 can also have vertical coverage that is large enough to encompass product scanning region 225 and also to be able to view the facial features of a user of kiosk 10. For example, the angle 320 between lower boundary 310 and upper boundary 315 of second field-of-view 305 can be approximately 110 degrees. This allows kiosk 10 to use facial recognition to perform various functions, such as security monitoring, such as capturing the face of a customer along with suspected theft events that are logged, purchase of age restricted items, facial identification payment methods, etc.

By using imaging assembly 205 and vision camera 300, two different sides of each item that is scanned are being viewed and kiosk 10 can perform more confident checks against scan avoidance and ticket switching. For example, if a user of kiosk 10 tries to avoid scanning an item by passing the item above, below, or out of range of first field-of-view 220 of barcode reader module 200, vision camera 300 would see the item move past, which could flag a scan avoidance event. In addition, if a user of kiosk 10 covers an item with another item on the side facing barcode reader module 200, vision camera 300 would see that the top of the item was different than the front side of the item, which could flag a ticket switching event.

In some embodiments, if desired, a second vision camera 400 can also be positioned within housing 100 and positioned below and in general vertical alignment with imaging assembly 205 of barcode reader module 200. Second vision camera 400 can also be a 2 megapixel color camera and can be its own unit or can be part of barcode reader module 200. In this embodiment, second vision camera 400 has a third field-of-view 405 that faces generally upward and intersects first field-of-view 220 of imaging assembly 204 and second field-of-view 305 of vision camera 300 with product scanning region 225. Because third field-of-view 405 of second vision camera 400 faces generally upward, third field-of-view 405 may also be able to view the facial features of a user of kiosk 10, which would also assist in the use of facial recognition to perform various functions, such as security, purchase of age restricted items, facial identification payment methods, etc.

Vision camera 300 and second vision camera 400 could also be synchronized with any illumination provided by barcode reader module 200, such that vision camera 300 and second vision camera 400 either capture images during illumination bursts or in between illumination bursts. Second field-of-view 305 of vision camera 300 and third field-of-view 405 of second vision camera 400 can also be broken down into two regions, a facial recognition region above any illumination provided by barcode reader module 200 that captures images when the illumination is off and a product recognition region within product scanning region 225 that captures images when the illumination is on. This could provide for facial images without the annoyance of illumination to a user and object recognition images that are higher in contrast due to the additional illumination.

Central processing unit 500 is also preferably positioned within housing 100, is operatively connected to barcode reader module 200, vision camera 300, and second vision camera 400 (if used), and is configured to decode barcodes captured by barcode reader module 200 and perform advanced processing, such as facial recognition, object recognition, and gesture recognition, of images received from vision camera 300 and second vision camera 400 (if used). Central processing unit 500 can also be configured to perform advanced processing, such as facial recognition, object recognition, and gesture recognition, of images received from imaging assembly 205 of barcode reader module 200. With second field-of-view 305 oriented to encompass object that are located adjacent to kiosk 10, central processing unit 500 can also be configured to recognize that an object is located adjacent kiosk 10, for example in a cart, basket, or bagging area, from the images received from vision camera 300, determine if the object has been scanned by barcode reader module 200, determine if a user is attempting to complete a transaction, and provide an alert if the user is attempting to complete the transaction with an object detected adjacent kiosk 10 that has not been scanned by barcode reader module 200. Central processing unit 500 can also be configured to provide an alert if the user is attempting to complete the transaction and an object is detected that is adjacent to kiosk 10 and has not been removed from a cart, basket, or bagging area, whether or not the object has been scanned, to alert the user that the object is there and is not forgotten.

Figure 9:
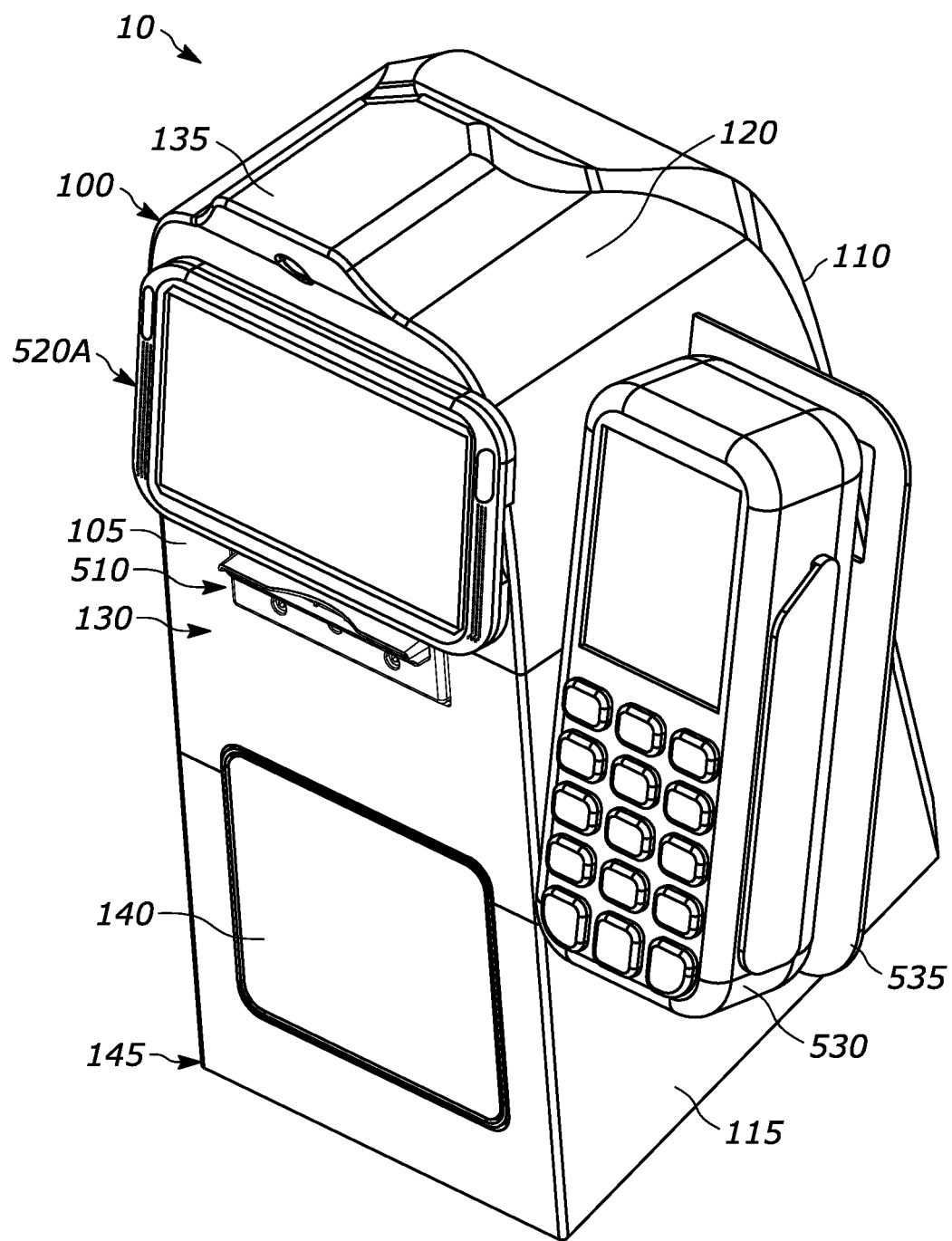
FIG. 9 illustrates a perspective view of the kiosk of FIG. 1 with an alternative external display module.
Figure 10:
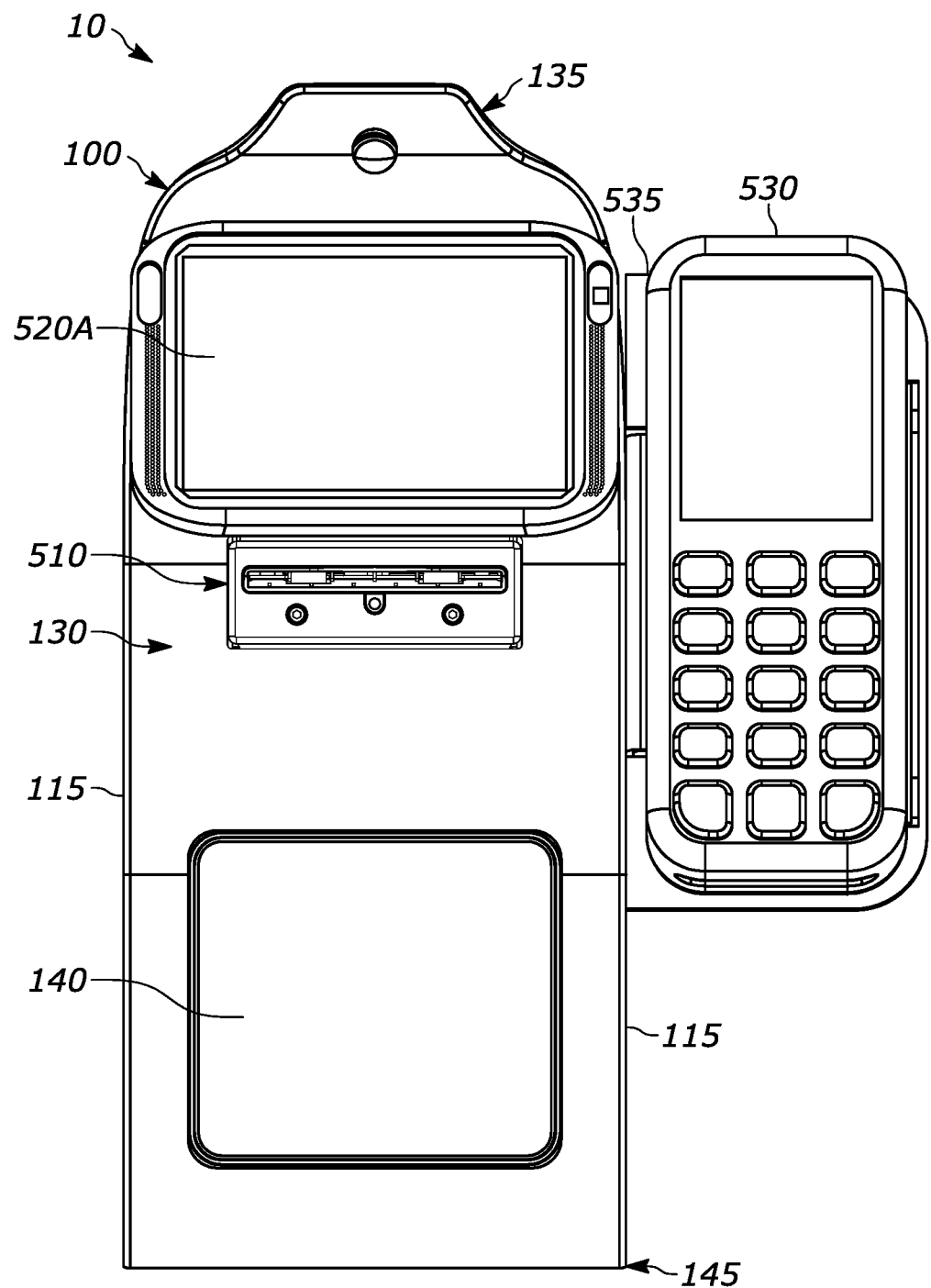
FIG. 10 illustrates a front view of the kiosk of FIG. 9.
Figure 11:
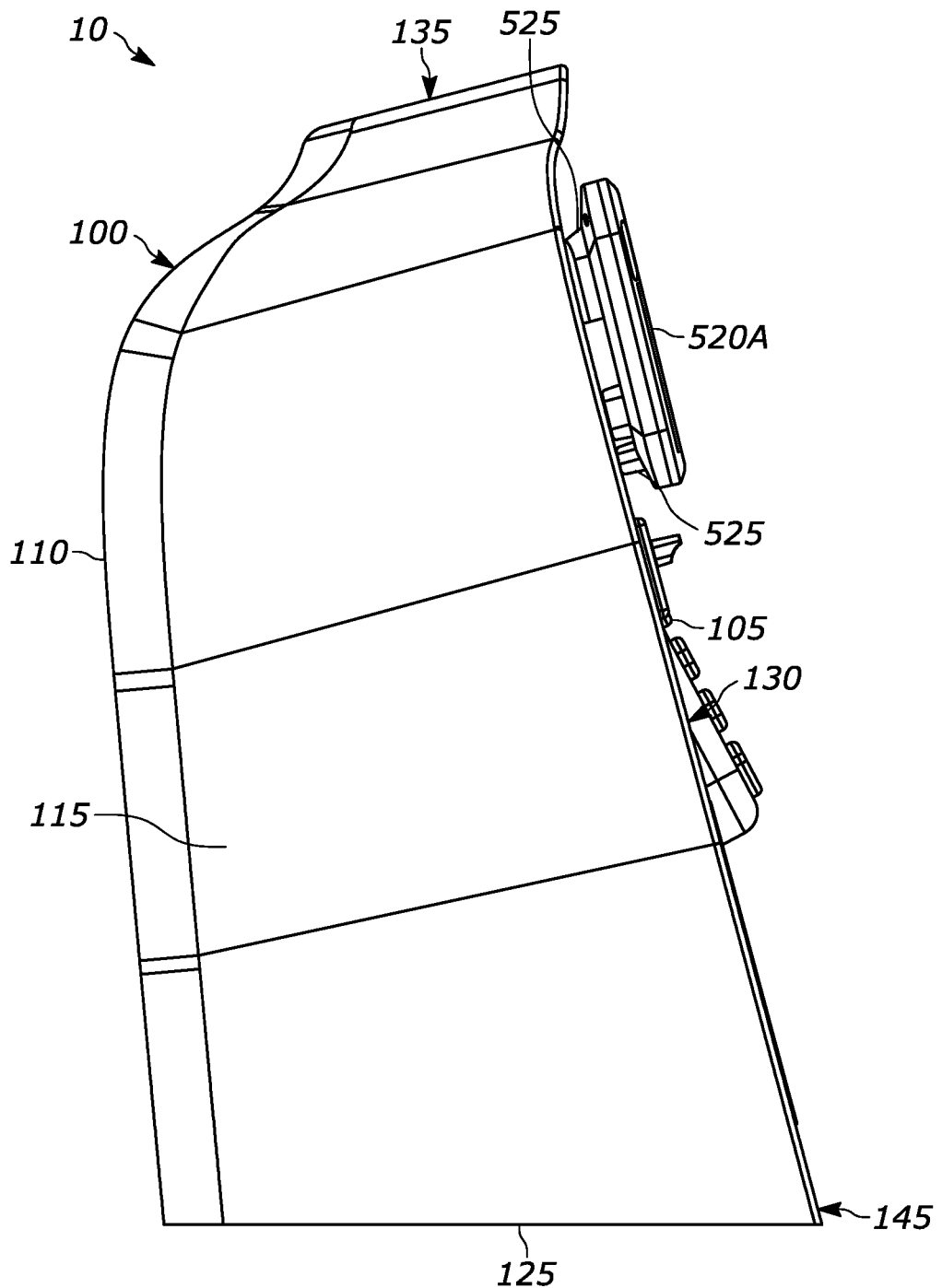
FIG. 11 illustrates a left side view of the kiosk of FIG. 9.

Kiosk 10 also has a display module 520 positioned within housing 100 and, preferably, above and in general vertical alignment with barcode reader module 200 and below upper portion 135 of housing 100. Alternatively, as shown in FIGS. 9-11, display module 520A can be a separate unit that is position outside housing 100 and is removably mounted to front surface 130 of housing 100, for example by mounting bracket 525. Whether positioned within housing 100 or mounted external to housing 100, display module 520, 520A is also operatively connected to central processing unit 500.

Depending on the particular application and use, kiosk 10 can also include a printer 510 that can be used to print receipts, coupons, etc. Printer 510 is preferably positioned within housing 100, above and in general vertical alignment with barcode reader module 200 and below upper portion 135 of housing 100. Alternatively, printer 510 can also be a separate unit that is positioned near kiosk 10 or mounted to housing 100 and is operatively connected to central processing unit 500. When mounted in housing 100, second field-of-view 305 of vision camera 300 encompasses the area in front of printer 510 and central processing unit can be configured to provide an alert if a receipt has not been taken from printer 510.

Kiosk 10 can also include a payment terminal 530 that can be used to receive card payment for transactions. Payment terminal 530 is preferably mounted to housing 100, for example by mounting bracket 535, but could also be separate and positioned near kiosk 10. Whether mounted to housing 100 or located near kiosk 10, payment terminal 530 is preferably positioned and second field-of-view 305 of vision camera 300 is wide enough to encompass the area directly in front of payment terminal 530. This allows kiosk 10 to monitor payment terminal 530 and central processing unit 500 can be configured to provide an alert if a card is left in payment terminal 530. Alternatively, payment terminal 530 can be positioned within housing 100, for example, in general vertical alignment with barcode reader module 200, printer 510, and display module 520. To save space, payment terminal 530 can also be partially integrated with display module 520 such that a chip reader and a magnetic strip reader are integrated into housing and display module 520 is configured to be used as the display and input device (touchscreen) for payment terminal 530.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A kiosk, comprising:
   a housing defining a front surface and having an upper portion that extends outward past the front surface;
   a barcode reader module positioned within the housing, the barcode reader module including an imaging assembly having a first field-of-view that extends through a window in the housing and defines a product scanning region;
   a vision camera positioned within the upper portion of the housing with at least a portion of the vision camera located forward of the front surface of the housing, the vision camera positioned above and in general vertical alignment with the barcode reader module and having a second field-of-view facing generally downward and intersecting the first field-of-view of the barcode reader module within the product scanning region; and a central processing unit positioned within the housing and operatively connected to the barcode reader module and the vision camera, the central processing unit configured to decode barcodes captured by the barcode reader module and perform advanced processing of images received from the vision camera, wherein the vision camera is positioned more than 12 inches above a bottom of the housing.

2. The kiosk of claim 1, wherein performing advanced processing of images received from the vision camera comprises at least one of facial recognition, object recognition, and gesture recognition.

3. The kiosk of claim 1, wherein the central processing unit is configured to perform advanced processing of images received from the barcode reader module, the advanced processing of images received from the barcode reader module comprising at least one of facial recognition, object recognition, and gesture recognition.

4. The kiosk of claim 1, wherein the vision camera is positioned 14½ inches above the bottom of the housing.

5. The kiosk of claim 1, wherein the second field-of-view of the vision camera is oriented to encompass objects located adjacent to the kiosk.

6. The kiosk of claim 5, wherein the central processing unit is configured to recognize that an object is located adjacent to the kiosk from images received from the vision camera, determine if a user is attempting to complete a transaction, and provide an alert if the object is detected, the object has not been scanned by the barcode reader module, and the user is attempting to complete the transaction.

7. The kiosk of claim 1, wherein a lower boundary of the second field-of-view of the vision camera is less than 2 inches from the front surface of the housing at a bottom of the housing.

8. The kiosk of claim 7, wherein the lower boundary of the second field-of-view of the vision camera is substantially parallel to the front surface of the housing.

9. The kiosk of claim 8, wherein an angle between the lower boundary and an upper boundary of the second field-of-view of the vision camera is 110 degrees.

10. The kiosk of claim 1, wherein the vision camera is a 2 megapixel color camera.

11. The kiosk of claim 1, comprising a printer positioned within the housing above and in general vertical alignment with the barcode reader module and a display module positioned above and in general vertical alignment with the barcode reader module.

12. The kiosk of claim 11, wherein the printer and the display module are positioned below the upper portion of the housing.

13. The kiosk of claim 11, wherein the display module is positioned within the housing.

14. The kiosk of claim 11, wherein the display module is positioned outside the housing and mounted to the front surface of the housing.

15. The kiosk of claim 1, comprising a payment terminal, wherein the second field-of-view of the vision camera is wide enough to encompass an area directly in front of the payment terminal.

16. The kiosk of claim 1, comprising a second vision camera positioned within the housing, the second vision camera positioned below and in general vertical alignment with the imaging assembly of the barcode reader module and having a third field-of-view facing generally upward and intersecting the first field-of-view of the barcode reader module and the second field-of-view of the vision camera within the product scanning region.

17. The kiosk of claim 16, wherein the second vision camera is part of the barcode reader module.

18. A kiosk, comprising:
a housing defining a front surface and having an upper portion that extends outward past the front surface;
a barcode reader module positioned within the housing, the barcode reader module including an imaging assembly having a first field-of-view that extends through a window in the housing and defines a product scanning region;
a vision camera positioned within the upper portion of the housing with at least a portion of the vision camera located forward of the front surface of the housing, the vision camera positioned above and in general vertical alignment with the barcode reader module and having a second field-of-view facing generally downward and intersecting the first field-of-view of the barcode reader module within the product scanning region; and
a central processing unit positioned within the housing and operatively connected to the barcode reader module and the vision camera, the central processing unit configured to decode barcodes captured by the barcode reader module and perform advanced processing of images received from the vision camera,
wherein a lower boundary of the second field-of-view of the vision camera is less than 2 inches from the front surface of the housing at a bottom of the housing.

19. The kiosk of claim 18, wherein performing advanced processing of images received from the vision camera comprises at least one of facial recognition, object recognition, and gesture recognition.

20. The kiosk of claim 18, wherein the central processing unit is configured to perform advanced processing of images received from the barcode reader module, the advanced processing of images received from the barcode reader module comprising at least one of facial recognition, object recognition, and gesture recognition.

21. The kiosk of claim 18, wherein the vision camera is positioned more than 12 inches above a bottom of the housing.

22. The kiosk of claim 21, wherein the vision camera is positioned 14½ inches above the bottom of the housing.

23. The kiosk of claim 21, wherein the second field-of-view of the vision camera is oriented to encompass objects located adjacent to the kiosk.

24. The kiosk of claim 23, wherein the central processing unit is configured to recognize that an object is located adjacent to the kiosk from images received from the vision camera, determine if a user is attempting to complete a transaction, and provide an alert if the object is detected, the object has not been scanned by the barcode reader module, and the user is attempting to complete the transaction.

25. The kiosk of claim 18, wherein the lower boundary of the second field-of-view of the vision camera is substantially parallel to the front surface of the housing.

26. The kiosk of claim 25, wherein an angle between the lower boundary and an upper boundary of the second field-of-view of the vision camera is 110 degrees.

27. The kiosk of claim 18, wherein the vision camera is a 2 megapixel color camera.

28. The kiosk of claim 18, comprising a printer positioned within the housing above and in general vertical alignment with the barcode reader module and a display module positioned above and in general vertical alignment with the barcode reader module.

29. The kiosk of claim 28, wherein the printer and the display module are positioned below the upper portion of the housing.

30. The kiosk of claim 28, wherein the display module is positioned within the housing.

31. The kiosk of claim 28, wherein the display module is positioned outside the housing and mounted to the front surface of the housing.

32. The kiosk of claim 18, comprising a payment terminal, wherein the second field-of-view of the vision camera is wide enough to encompass an area directly in front of the payment terminal.

33. The kiosk of claim 18, comprising a second vision camera positioned within the housing, the second vision camera positioned below and in general vertical alignment with the imaging assembly of the barcode reader module and having a third field-of-view facing generally upward and intersecting the first field-of-view of the barcode reader module and the second field-of-view of the vision camera within the product scanning region.

34. The kiosk of claim 33, wherein the second vision camera is part of the barcode reader module.

\* \* \* \* \*